US007444060B2

(12) United States Patent
Yoda

(10) Patent No.: US 7,444,060 B2
(45) Date of Patent: Oct. 28, 2008

(54) LIQUID EJECTING APPARATUS

(75) Inventor: Kaneo Yoda, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/055,155

(22) Filed: Mar. 25, 2008

(65) Prior Publication Data

US 2008/0238972 A1 Oct. 2, 2008

(30) Foreign Application Priority Data

Mar. 26, 2007 (JP) ............................. 2007-078423
Mar. 26, 2007 (JP) ............................. 2007-078424
Mar. 26, 2007 (JP) ............................. 2007-078425
Jan. 31, 2008 (JP) ............................. 2008-020340

(51) Int. Cl.
*G02B 6/00* (2006.01)

(52) U.S. Cl. ....................... 385/147; 385/134; 385/140; 347/101; 347/103

(58) Field of Classification Search ................. 385/134, 385/140, 147; 347/101, 103
See application file for complete search history.

(56) References Cited

U.S. PATENT DOCUMENTS 5,674,345 A * 10/1997 Nash .......................... 156/264
6,588,954 B2 * 7/2003 Verhoest et al. ............. 400/635

FOREIGN PATENT DOCUMENTS

JP 2005-067127 3/2005
JP 2006-021336 1/2006

* cited by examiner

*Primary Examiner*—Jennifer Doan
(74) *Attorney, Agent, or Firm*—Workman Nydegger

(57) ABSTRACT

A liquid ejecting apparatus which includes a plurality of transport belts, upstream and downstream liquid ejecting units that include a plurality of liquid ejecting heads which are arranged at predetermined intervals in a direction orthogonal to the direction that the printing medium is transported through the apparatus, a maintenance unit that is provided between the transport belts, and a positioning unit that establishes the relative position between the upstream liquid ejecting unit, the upstream transport unit, the downstream liquid ejecting unit, and the downstream transport unit by moving components of the upstream liquid ejecting unit, the upstream transport unit, the downstream liquid ejecting unit, and the downstream transport unit in a direction that is orthogonal to the transport direction such that the liquid ejecting heads of the upstream and downstream liquid ejecting units face the maintenance unit during a maintenance operation.

14 Claims, 6 Drawing Sheets

LIQUID EJECTING APPARATUS

BACKGROUND OF THE INVENTION

The entire disclosures of Japanese Patent Application Nos. 2007-078423, filed Mar. 26, 2007, 2007-078424, filed Mar. 26, 2007, 2007-078425, filed Mar. 26, 2007, and 2007-020340, filed Jan. 31, 2008 are expressly incorporated herein by reference.

1. Technical Field

The present invention relates to a liquid ejecting apparatus. More specifically, the present invention relates to a liquid ejecting apparatus capable of ejecting a liquid from a liquid ejecting head onto a medium transported through the liquid ejecting apparatus via transport belts.

2. Related Art

One type of liquid ejecting apparatus currently used in the related art is a fixed head ink jet printer which is capable of performing a printing process by transporting a printing medium by electrostatically attracting the printing medium to a transport belt, and discharging ink droplets onto the medium as it is transported by the transport belt. The ink droplets are discharged from rows of nozzles that are formed in the ejecting head in a direction along the width of the transport belt that is orthogonal to the transport direction.

In general, ink jet printers perform maintenance operations to prevent the nozzles from clogging. During one typically maintenance operation that is periodically performed, the ink jet printer performs a flushing operation wherein the ink jet heads is moved toward a head recovery unit provided around the transport belt, below the ink jet heads, by discharging ink droplets from all the nozzles in the ink jet heads. In another cleaning operation, the head recovery unit is moved to bring the caps into contact with the nozzle surface of the ink jet head, wherein the ink is sucked from the ink jet head. In addition, when printing is not being performed, the ink jet printer performs a capping operation wherein the caps are brought into contact with the nozzle surface of the ink jet head in order to close the nozzles.

However, such embodiments, when a printing operation is interrupted in order to perform the flushing or cleaning operation, the head recovery unit returns to the position close to the transport belt, wherein printing is resumed. Because the flushing or cleaning operation is periodically performed, the efficiency of printing is likely to deteriorate. Further, when printing starts during the capping operation, it is necessary to move the ink jet heads from the position close to the transport belts to the upper side of the transport belts. In this case, the time required to start printing is increased, lowering the efficiency of the printing operation.

In order to improve the efficiency of printing, a structure has been proposed in Japanese Patent Application No. JP-A-2005-67127, wherein a plurality of upstream transport belts and a plurality of downstream transport belts with relatively narrow widths are arranged in a zigzag pattern. The plurality of upstream ink jet heads are arranged above the upstream transport belts so as to be interposed between the upstream transport belts, while a plurality of downstream ink jet heads are arranged above the downstream transport belts so as to be interposed between the downstream transport belts. During flushing operations, ink droplets are discharged onto regions of the printing medium between the upstream transport belts and downstream transport belts without moving the ink jet heads or head recovery unit. During a cleaning or capping operation, the head recovery unit provided between the transport belts moves up, without moving the ink jet head, in order to bring the caps into close contact with the nozzle surface of the ink jet head in order to cap the nozzles or suck ink from the ink jet heads.

While, the disclosed ink jet printer is capable of improving the efficiency of the printing process, it is difficult to keep regions of the printing medium onto which ink droplets are discharged from moving since the regions are positioned between the upstream transport belts or the downstream transport belts during the printing operation. This causes difficulties for example, when the distance between the ink jet head and the printing medium varies, making it difficult to accurately land ink droplets to target positions on the printing medium. As a result, image blur or distortion occurs, and image quality is lowered.

BRIEF SUMMARY OF THE INVENTION

An advantage of some aspects of the invention is a liquid ejecting apparatus capable of improving the discharge efficiency of a liquid material onto a printing medium by increasing the flatness of regions of the medium onto which liquid droplets are discharged.

According to an aspect of the invention, there is provided a liquid ejecting apparatus capable of ejecting a liquid material from liquid ejecting heads onto a medium transported by transport belts. The apparatus comprises an upstream transport unit that includes a plurality of transport belts, which are rotated in a transport direction corresponding to the direction in which the medium is transported, which are arranged at predetermined intervals in a direction orthogonal to the transport direction, a downstream transport unit provided further downstream than the upstream transport unit in the transport direction which includes a plurality of transport belts, which are rotated in the transport direction and arranged at predetermined intervals in the direction orthogonal to the transport direction, an upstream liquid ejecting unit that includes a plurality of liquid ejecting heads which are arranged at predetermined intervals in the direction orthogonal to the transport direction, a downstream liquid ejecting unit that includes a plurality of liquid ejecting heads which are arranged at predetermined intervals in the direction orthogonal to the transport direction, a maintenance unit that is provided between the transport belts of the upstream transport unit and downstream transport unit, and a position setting unit that is capable of establishing the relative positions of the upstream liquid ejecting unit, the upstream transport unit, the downstream liquid ejecting unit, and the downstream transport unit during a printing process such that the liquid ejecting heads of the upstream liquid ejecting unit face and the downstream liquid ejecting unit face the transport surfaces of the transport belts of the upstream transport unit and downstream transport unit, respectively, and being further capable of establishing the relative positions of the upstream liquid ejecting unit, the upstream transport unit, the downstream liquid ejecting unit, and the downstream transport unit during a maintenance process such that the liquid ejecting heads of the upstream liquid ejecting unit and the downstream liquid ejecting unit face the maintenance unit.

During a printing operation, since regions of the printing medium onto which a liquid material is discharged are attracted to the transport belts, it is possible to prevent the regions from curling away from the belts. Therefore, it is possible to improve the flatness of the regions onto which a liquid material is discharged, as compared to Methods currently used in the art. Moreover, aspects of the invention increase the speed of the printing operations, by decreasing the distance that the various components need to move to perform the various operations.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
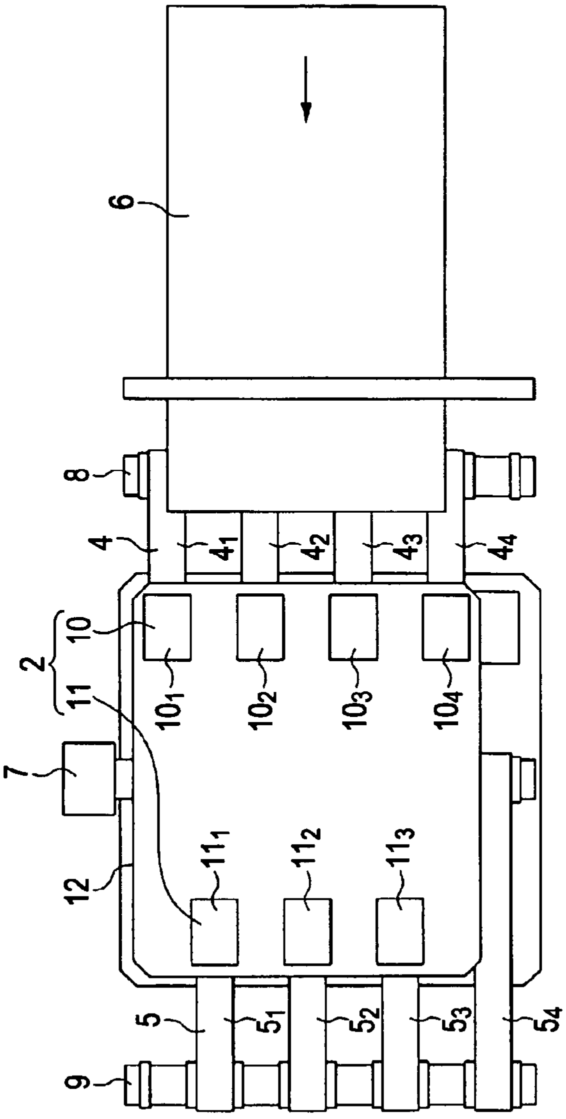
FIGS. 1A and 1B illustrate the structure of an ink jet printer according to an embodiment of the invention.
Figure 1B:
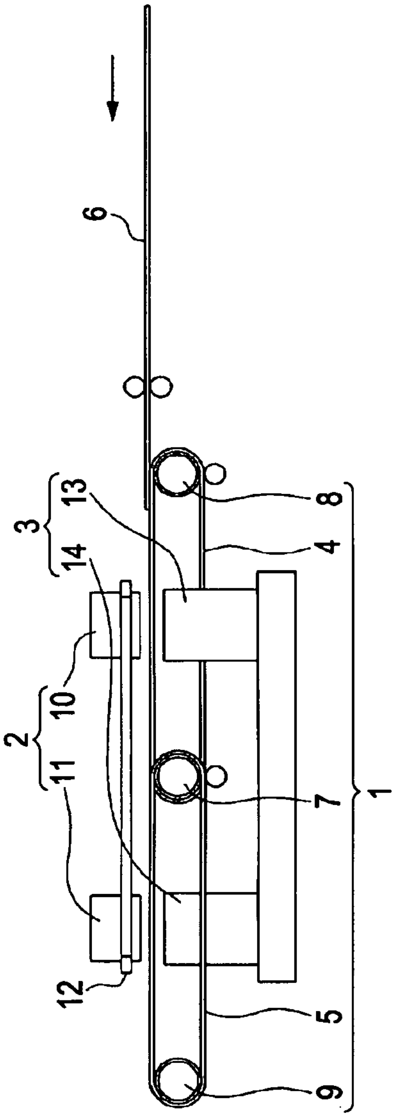

Hereinafter, the present invention will be described with reference to an ink jet printer which is capable of discharging ink in the form characters or images onto a printing medium. FIGS. 1A and 1B are diagrams schematically illustrating the structure of the ink jet printer according to this embodiment. As shown in FIGS. 1A and 1B, the ink jet printer includes a sheet transport unit 1, a head unit 2, and a maintenance unit 3.

Figure 2:
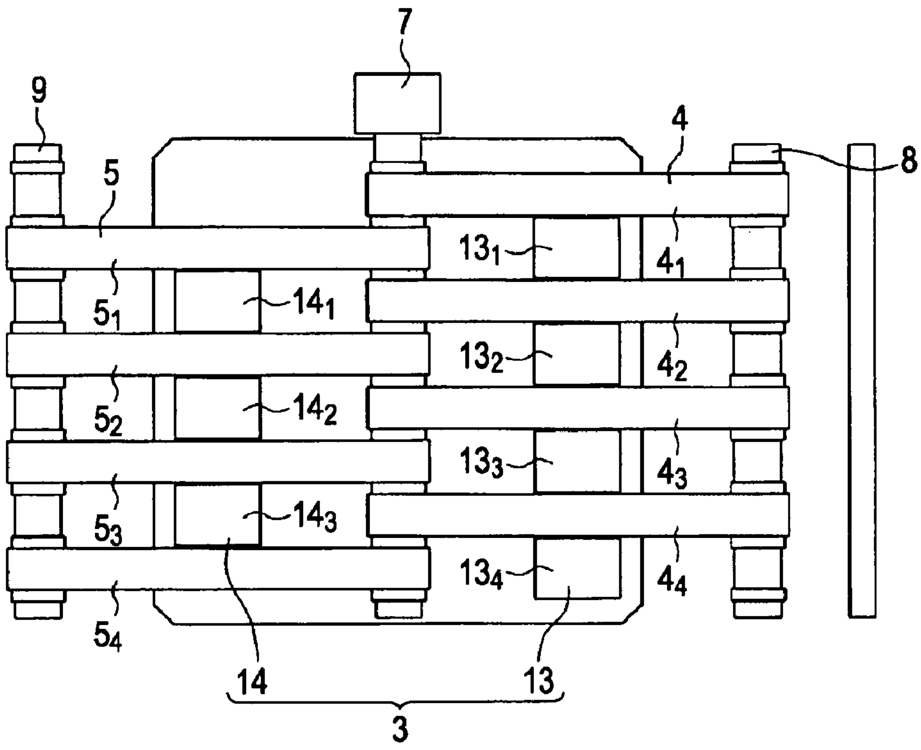
FIG. 2 illustrates the structure of a sheet of paper as it moves through the transport unit shown in FIGS. 1A and 1B.

As shown in FIG. 2, the sheet transport unit 1 includes an upstream transport unit 4 and a downstream transport unit 5 that is provided downstream from the upstream transport unit 4.

The upstream transport unit 4 includes a plurality of transport belts 4*a*-4*d*, which are wound around an driven roller 8 and a driving roller 7 so as to rotate the belts 4*a*-4*d* in the transport direction. The transport belts 4*a*-4*d* are arranged at predetermined intervals in a direction orthogonal to the transport direction. In this way, when the driving roller 7 is rotated by a transport belt motor, the transport belts 4*a*-4*d* are rotated in the transport direction.

The upstream portion of the transport unit 4 applies electrostatic charges to the printing medium 6 that is fed by a sheet feeding unit (not shown), using a static electricity applying unit, such as a corotron, to electrostatically attract a lower surface of the printing medium 6 to the upper outer circumferences of the transport belts 4*a*-4*d*, so as to transport the printing medium 6 from the lower sides of ink jet heads 10*a*-10*d* of an upstream portion of the ink droplet discharging unit 10 to the upper sides of transport belts 5*a*-5*d* of the downstream transport unit 5, that is, in the direction of an arrow shown in FIGS. 1A and 1B.

The downstream transport unit 5 includes a plurality of transport belts 5*a*-5*d*, which are wound around the driving roller 7 and a downstream driven roller 9. The transport belts 5*a*-5*d* are arranged at predetermined intervals in the direction orthogonal to the direction in which the printing medium 6 is transported. That is, the transport belts 5*a*-5*d* and 4*a*-4*d* are arranged alternating pattern. In this way, when the driving roller 7 is rotated by the transport belt motor, and the transport belts are rotated in the transport direction.

The downstream transport unit 5 acquires the printing medium 6 transported by the upstream transport unit 4. In addition, the downstream transport unit 5 electrostatically attracts the lower surface of the printing medium 6 to the upper outer circumferences of the transport belts 5*a*-5*d*, so as to transport the printing medium 6 from the lower sides of ink jet head 11*a*-11*c* of a downstream ink droplet discharging unit 11, described more fully below to a sheet discharging unit (not shown). The head unit 2 includes the upstream ink droplet discharging unit 10 arranged above the upstream transport unit 4, the downstream ink droplet discharging unit 11 that is arranged above the downstream transport unit 5, and a head moving unit 12.

The upstream ink droplet discharging unit 10 includes a plurality of ink jet heads 10*a*-10*d*, which are arranged at predetermined intervals in a direction orthogonal to the transport direction. The ink jet heads 10*a*-10*d* include a plurality of nozzle rows that correspond to black (K), yellow (Y), magenta (M), and cyan (C) colors. The nozzle rows are sequentially arranged in the direction orthogonal the transport direction. The distance between the centers of the ink jet heads 10*a*-10*d* in the direction orthogonal to the transport direction, herein referred to as "pitch" is equal to the distance between the centers of the transport belts 4*a*-4*d*.

When a printing request is issued, the upstream ink droplet discharging unit 10 is moved by the head moving unit 12 so as to be arranged above the transport belts 4*a*-4*d* of the upstream transport unit 4, so that the nozzle surface faces the outer circumferences of the transport belts 4*a*-4*d* with which the lower surface of the printing medium 6 comes into contact. Then, the ink jet heads 10*a*-10*d* discharge ink droplets onto the printing medium 6 to perform a printing process. That is, during the printing operation, the nozzle surfaces of the ink jet heads 10*a*-10*d* face the transport surfaces of the corresponding transport belts 4*a*-4*d* with a predetermined distance therebetween.

The downstream ink droplet discharging unit 11 includes a plurality of ink jet heads 11*a*-11*c*. The ink jet heads 11*a*-11*c* are arranged at predetermined intervals in a direction orthogonal to the transport direction, and include a plurality of nozzle rows that correspond to colors K, Y, M, and C. The ink jet heads 11*a*-11*c* are arranged in the direction orthogonal the transport direction in which the printing medium 6 is transported. As in the ink jet heads 10*a*-10*c*, the distance between the centers of the ink jet heads 11*a*-11*c* is equal to the distance between the centers of the transport belts 5*a*-5*d*, or pitch.

When a printing operation is requested, the downstream ink droplet discharging unit 11 is moved by the head moving unit 12 so as to be arranged above the transport belts 5*a*-5*d* of the downstream transport unit 5 such that its nozzle surface faces the outer circumferences of the transport belts 5*a*-5*d* with which the lower surface of the printing medium 6 comes into contact. Then, the ink jet heads 11*a*-11*c* discharge ink droplets onto the printing medium 6 to perform a printing operation on the remaining region which has not been printed by the upstream ink droplet discharging unit 10. Thus the entire ink image is formed. That is, during the printing operation, the nozzle surfaces of the ink jet heads 11*a*-11*c* face the transport surfaces of the corresponding transport belts 5*a*-5*d* with a predetermined distance therebetween.

The upstream ink droplet discharging unit 10 and the downstream ink droplet discharging unit 11 may be driven by any number of methods, such as electrostatic actuator methods, piezo methods, or film boiling methods.

Figure 4A:
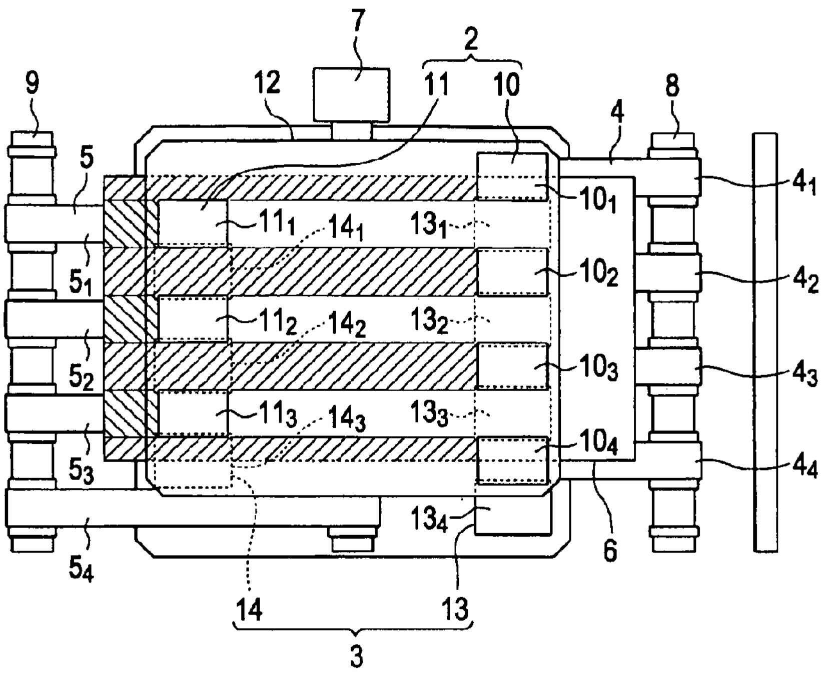
FIGS. 4A and 4B illustrate the operation of the ink jet printer during a printing process.
Figure 4B:
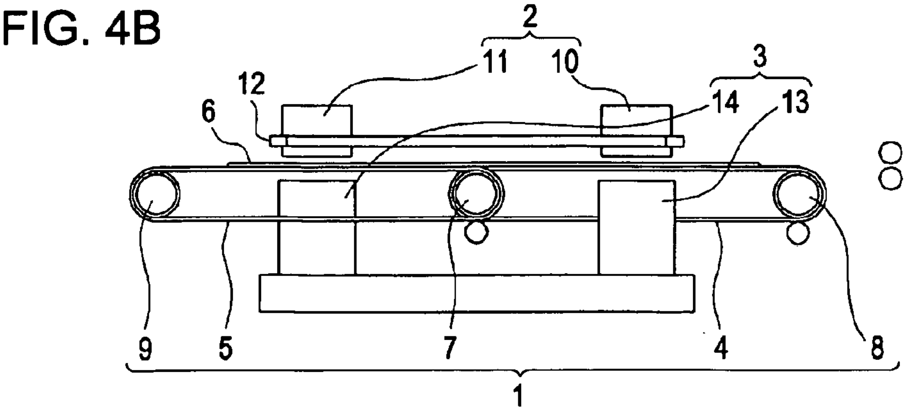

When a print request is issued, as shown in FIGS. 4A and 4B, before the upstream ink droplet discharging unit 10 and the downstream ink droplet discharging unit 11 discharge ink droplets, the head moving unit 12 moves the upstream ink droplet discharging unit 10 and the downstream ink droplet discharging unit 11 in the direction orthogonal to the transport direction, while maintaining the relative position between the ink jet heads 10*a*-10*d* and the ink jet heads 11*a*-11*c*, such that the ink jet heads 10*a*-10*d* of the upstream ink droplet discharging unit 10 are arranged above the transport belts 4*a*-4*d* of the upstream transport unit 4 so as to face the outer circumferences of the corresponding transport belts 4*a*-4*d*. Meanwhile the ink jet heads 11*a*-11*c* of the downstream ink droplet discharging unit 11 are arranged above the transport belts 5*a*-5*d* of the downstream transport unit 5 so as to face the outer circumferences of the corresponding transport belts 5*a*-5*d*. In this way, the relative position between the upstream ink droplet discharging unit 10 and the upstream transport unit 4 and the relative position between the downstream ink droplet discharging unit 11 and the downstream transport unit 5 are established.

Figure 6A:
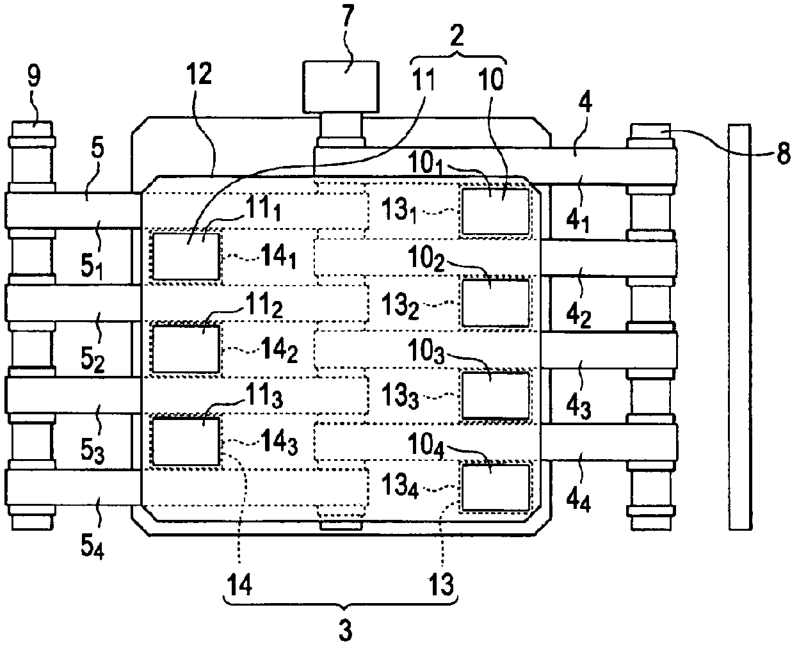
FIGS. 6A and 6B illustrate the operation of the ink jet printer during a flushing or non-capping process.
Figure 6B:
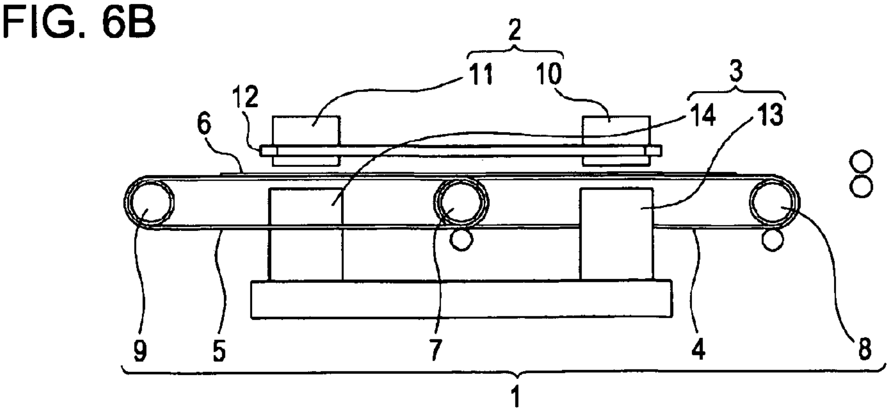

Before the upstream maintenance unit 13 and a downstream maintenance unit 14 (described more fully below) move upward in response to a cleaning request or a capping request, or before the upstream ink droplet discharging unit 10 and the downstream ink droplet discharging unit 11 discharge ink droplets in response to a flushing request, as shown in FIGS. 6A and 6B, the head moving unit 12 moves the upstream ink droplet discharging unit 10 and the downstream ink droplet discharging unit 11 in a direction orthogonal to the transport direction, while maintaining the relative position between the ink jet heads 10*a*-10*d* and 11*a*-11*c*. Thus, the ink jet heads 10*a*-10*d* of the upstream ink droplet discharging unit 10 are arranged so as to be above and in between the transport belts 4*a*-4*d* of the upstream transport unit 4, while the ink jet heads 11*a*-11*c* of the downstream ink droplet discharging unit 11 are arranged to be above and in between the transport belts 5*a*-5*d* of the downstream transport unit 5. In this way, the relative position between the upstream ink droplet discharging unit 10 and the downstream ink droplet discharging unit 11 remains the same.

That is, when the cleaning, capping, or flushing operation is performed, the head moving unit 12 moves the upstream ink droplet discharging unit 10 and the downstream ink droplet discharging unit 11*a* distance that is orthogonal to the transport direction by a distance that is half the length of the pitch. The maintenance unit 3 includes the upstream maintenance unit 13 and the downstream maintenance unit 14.

Figure 5A:
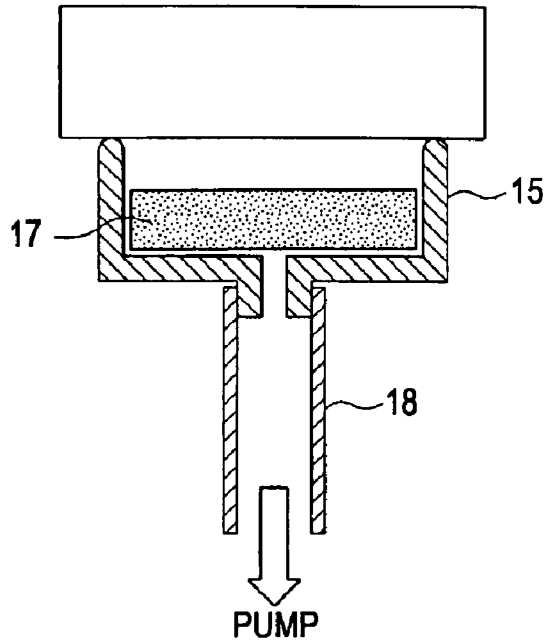
FIGS. 5A and 5B illustrate the structure of a cleaning unit.
Figure 5B:
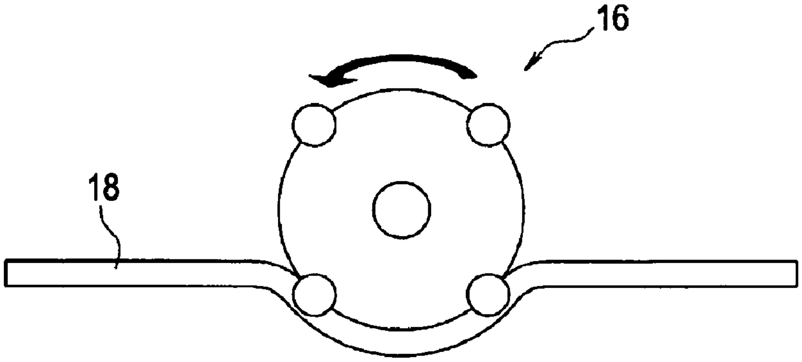

The upstream maintenance unit 13 includes a plurality of cap portions 13*a*-13*d* interposed between the transport belts 4*a*-4*d* of the upstream transport unit 4. When the cleaning, capping, or flushing process is performed, as shown in FIGS. 6A and 6B, first, the head moving unit 12 moves the upstream ink droplet discharging unit 10 such that the ink jet heads 10*a*-10*d* are interposed between the transport belts 4*a*-4*d* of the upstream transport unit 4, such that the ink jet heads 10*a*-10*d* face the upstream maintenance unit 13. When the cleaning or capping request is performed, as shown in FIG. 3B, the upstream maintenance unit 13 moves upward to bring a cap 15, which is formed at its upper part, into contact with the nozzle surface of the ink jet heads 10*a*-10*d*, thereby closing up the nozzles, as shown in FIG. 5A. Then, during the cleaning process, a pump 16 shown in FIG. 5B sucks ink from the ink jet heads 10*a*-10*d* of the upstream ink droplet discharging unit 10.

The top of the cap 15 is opened toward each of the ink jet heads 10*a*-10*d* and 11*a*-11*c*. The cap 15 has an ink absorber 17 provided therein, which absorbs ink to prevent the ink from being adhered to the nozzles during pump suction. The upstream maintenance unit 13 drives the pump 16 to discharge air from the cap 15 through a tube 18 communicating with the cap 15, thereby reducing the internal pressure of the cap 15. In addition, the upstream maintenance unit 13 drives the pump 16 to suck ink from the nozzles in the ink jet heads 10*a*-10*d* of the upstream ink droplet discharging unit 10 such that the ink is absorbed by the ink absorber 17, and discharged into a waste ink tank (not shown) through the tube 18.

The cap 15 is formed of a material that is elastically deformable and does not deteriorate due to ink, such as rubber or elastomer.

When a print request is issued, the upstream maintenance unit 13 moves downward to open the nozzle surface of the upstream ink droplet discharging unit 10 into a non-capping state, so that the upstream ink droplet discharging unit 10 does not hinder the transportation of the printing medium 6 below the transport belts 4*a*-4*d* of the upstream transport unit 4.

When the flushing request is issued, ink is discharged from the nozzles in the ink jet heads 10*a*-10*d* of the upstream ink droplet discharging unit 10 are positioned as shown in FIGS. 6A and 6B, so as to correspond with the openings of the cap portions 13*a*-13*d*, where the ink is captured and absorbed by the ink absorber 17. That is, the upstream maintenance unit 13 also serves as an upstream flushing ink receiving unit.

The downstream maintenance unit 14 includes a plurality of cap portions 14*a*-14*c*, which are interposed between the transport belts 5*a*-5*d* of the downstream transport unit 5. When the cleaning, capping, or flushing request is issued, as shown in FIGS. 6A and 6B, the head moving unit 12 moves the downstream ink droplet discharging unit 11 such that the ink jet heads 11*a*-11*c* are interposed between the transport belts 5*a*-5*d* of the downstream transport unit 5, that is, the ink jet heads 11*a*-11*c* face the downstream maintenance unit 14. When the cleaning or capping request is issued, as shown in FIG. 3B, the downstream maintenance unit 14 moves upward to bring a cap 15, into close contact with the nozzle surface of each of the ink jet heads 11*a*-11*c*, so as to close up the nozzles, as shown in FIG. 5A. When the cleaning request is issued, the pump 16 shown in FIG. 5B sucks ink from the ink jet heads 11*a*-11*c* of the downstream ink droplet discharging unit 11. In addition, when a print request is issued, the downstream maintenance unit 14 moves downward to open the nozzle surface of the downstream ink droplet discharging unit 11, into a position that does not hinder the transportation of the printing medium 6 below the transport belts 5*a*-5*d* of the downstream transport unit 5.

When the flushing request is issued, ink is discharged from the nozzles in the ink jet heads 11*a*-11*c* of the downstream ink droplet discharging unit 11 to the openings of the cap portions 14*a*-14*c*, as shown in FIGS. 6A and 6B, where the ink is absorbed by the ink absorber 17. That is, the downstream maintenance unit 14 also serves as a downstream flushing ink receiving unit.

Operation

Next, the operation of the ink jet printer according to this embodiment will be described.

Figure 3A:
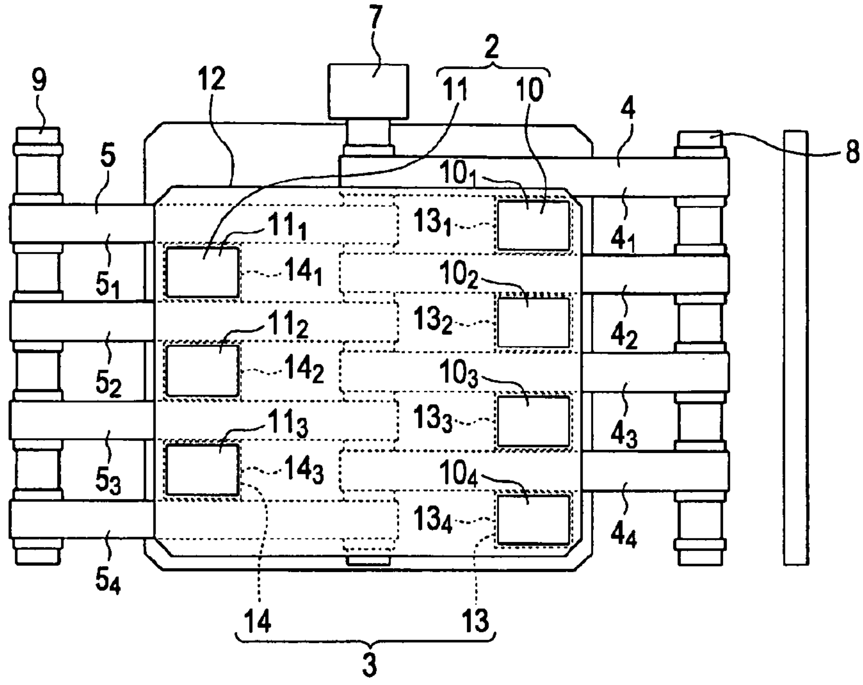
FIGS. 3A and 3B illustrate the operation of the ink jet printer during a cleaning or capping process.
Figure 3B:
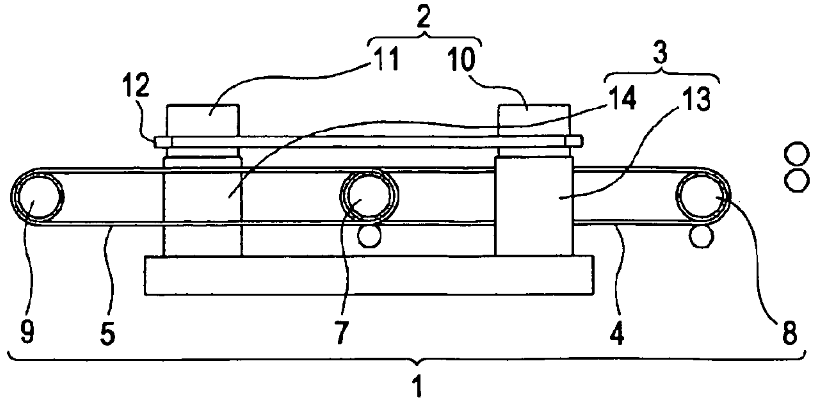

Prior to printing, as shown in FIGS. 3A and 3B, the ink jet heads 10*a*-10*d* of the upstream ink droplet discharging unit 10 are arranged above the transport belts 4*a*-4*d* of the upstream transport unit 4 so as to be interposed between the transport belts 4*a*-4*d*. Similarly, the ink jet heads 11*a*-11*c* of the downstream ink droplet discharging unit 11 are arranged above the transport belts 5*a*-5*d* of the downstream transport unit 5 so as to be interposed between the transport belts 5*a*-5*d*. Then, a capping process is performed to bring the caps into close contact with the nozzle surface of the upstream maintenance unit 13 and the nozzle surface of the downstream maintenance unit 14, as shown in FIGS. 6A and 6B. When a print request is issued from a host computer (not shown) to the ink jet printer, the upstream maintenance unit 13 and the downstream maintenance unit 14 move downward, from the configuration shown in FIGS. 6A and 6B, while the head moving unit 12 moves the upstream ink droplet discharging unit 10 and the downstream ink droplet discharging unit 11 above the upstream and downstream transport units 4 and 5 such that the ink jet heads 10*a*-10*d* and the ink jet heads 11*a*-11*c* are interposed between the transport belts 4*a*-4*d* of the upstream transport unit 4 and the transport belts 5*a*-5*d* of the downstream transport unit 5, respectively, as shown in FIGS. 4A and 4B.

Then, a sheet feed cassette feeds the printing medium 6 where the printing medium 6 is aligned by a gate roller. Then, the printing medium 6 is loaded on the transport belts 4*a*-4*d* of the upstream transport unit 4, where the static electricity applying unit applies electrostatic charge to the printing medium 6. In this way, the printing medium 6 is transported while being attracted to the transport belts 4*a*-4*d* by the electrostatic charge.

When the printing medium 6 is transported below rows of nozzles in the upstream ink droplet discharging unit 10, the upstream ink droplet discharging unit 10 starts a printing operation wherein ink droplets are discharged onto the printing medium 6 at a predetermined timing, starting from a row of nozzles on the upstream side. As a result, a number of rows of ink images with a number equal to the number of transport belts 4*a*-4*d* of the upstream transport unit 4 are printed on the printing medium 6 with a width that is equal to the nozzles in the ink jet heads 10*a*-10*d* of the upstream ink droplet discharging unit 10.

When the printing medium 6 reaches the downstream transport unit 5, the printing medium 6 is transferred from the upstream transport unit 4 to the transport belts 5*a*-5*d* of the downstream transport unit 5. Then, the printing medium 6 is transported while being electrostatically attracted to the transport belts 5*a*-5*d* by the applied electrostatic charge.

When the printing medium 6 is transported below rows of nozzles in the downstream ink droplet discharging unit 11, the downstream ink droplet discharging unit 11 starts a printing operation to discharge ink droplets in the area between the image rows printed by the upstream ink droplet discharging unit 10. The printing operation is performed at a predetermined timing, starting from a row of nozzles on the upstream side. As a result, an additional series of rows of ink images with a number equal to the number of transport belts 5*a*-5*d* of the downstream transport unit 5 are printed on the printing medium 6 with widths which are equal to the ink jet heads 11*a*-11*c* of the downstream ink droplet discharging unit 11. Thus, the image rows printed by the downstream ink droplet discharging unit 11 fill in the areas between the image rows printed by the upstream ink droplet discharging unit 10 in order to form the entire ink image.

When the printing medium 6 finishes the printing process, the printing medium 6 reaches a sheet discharging unit, where a sheet discharge roller of the sheet discharging unit and a spur discharge the printing medium 6 to a stacker (not shown).

After a predetermined time has elapsed from the start of printing, a cleaning or flushing request is issued, wherein the head moving unit 12 moves the upstream ink droplet discharging unit 10 and the downstream ink droplet discharging unit 11 orthogonal to the transport direction, while maintaining the relative position between the ink jet heads 10*a*-10*d* and 11*a*-11*c*, such that the ink jet heads 10*a*-10*d* of the upstream ink droplet discharging unit 10 are arranged above the transport belts 4*a*-4*d* of the upstream transport unit 4 so as to be interposed between the transport belts 4*a*-4*d*, and the ink jet heads 11*a*-11*c* of the downstream ink droplet discharging unit 11 are arranged above the transport belts 5*a*-5*d* of the downstream transport unit 5 so as to be interposed between the transport belts 5*a*-5*d*.

During a cleaning request, the cap portions 13*a*-13*d* of the upstream maintenance unit 13 and the cap portions 14*a*-14*c* of the downstream maintenance unit 14 move upward to bring the caps 15 into close contact with the nozzle surfaces of the ink jet heads 10*a*-10*d* of the upstream ink droplet discharging unit 10 and the nozzle surfaces of the ink jet heads 11*a*-11*c* of the downstream ink droplet discharging unit 11, thereby closing up the nozzles. Then, the pump 16 sucks ink from the ink jet heads 10*a*-10*d* of the upstream ink droplet discharging unit 10.

When the ink suction ends, the cleaning process ends. Then, when a printing request is issued again, the cap portions 13*a*-13*d* of the upstream maintenance unit 13 and the cap portions 14*a*-14*c* of the downstream maintenance unit 14 move downward, and the ink jet heads 10*a*-10*d* of the upstream ink droplet discharging unit 10 and the ink jet heads 11*a*-11*c* of the downstream ink droplet discharging unit 11 are arranged above the transport belts 4*a*-4*d* of the upstream transport unit 4 and the transport belts 5*a*-5*d* of the downstream transport unit 5, respectively. Then, the feed of the printing medium 6 is resumed, and the printing operation is resumed.

During a flushing request, after the upstream ink droplet discharging unit 10 and the downstream ink droplet discharging unit 11 are moved, all rows of nozzles in the ink jet heads 10*a*-10*d* of the upstream ink droplet discharging unit 10 and all rows of nozzles in the ink jet heads 11*a*-11*c* of the downstream ink droplet discharging unit 11 discharge ink droplets to the cap portions 13*a*-13*d* of the upstream maintenance unit 13 and the cap portions 14*a*-14*c* of the downstream maintenance unit 14.

When the discharge of ink droplets ends, the flushing operation ends. In this state, when a print request is issued again, the ink jet heads 10*a*-10*d* of the upstream ink droplet discharging unit 10 and the ink jet heads 11*a*-11*c* of the downstream ink droplet discharging unit 11 return above the transport belts 4*a*-4*d* of the upstream transport unit 4 and the transport belts 5*a*-5*d* of the downstream transport unit 5, respectively. Then, the feed of the printing medium 6 is resumed, and the printing process is resumed.

In the above-described embodiment, the head moving unit 12 shown in FIGS. 1A and 1B forms a positioning unit, as described in the claims.

Operations and Effects (1) As described above, during a printing operation of the ink jet printer described above, the relative positions of the upstream ink droplet discharging unit 10, upstream transport unit 4, downstream ink droplet discharging unit 11, and the downstream transport unit 5 are established such that the ink jet heads 10*a*-10*d* of the upstream ink droplet discharging unit 10 are arranged above the transport belts 4*a*-4*d* of the upstream transport unit 4, and the ink jet heads 11*a*-11*c* of the downstream ink droplet discharging unit 11 are arranged above the transport belts 5*a*-5*d* of the downstream transport unit 5, respectively. Then, during cleaning, capping, or flushing operations, the relative positions of the upstream ink droplet discharging unit 10, upstream transport unit 4, downstream ink droplet discharging unit 11, and the downstream transport unit 5 are established such that the ink jet heads 10*a*-10*d* of the upstream ink droplet discharging unit 10 are arranged above the transport belts 4*a*-4*d* of the upstream transport unit 4 so as to be interposed between the transport belts 4a-4d and the ink jet heads 11a-11c of the downstream ink droplet discharging unit 11 are arranged above the transport belts 5a-5d of the downstream transport unit 5 so as to be interposed between the transport belts 5a-5d.

In this way, during the cleaning operation, the position of the upstream ink droplet discharging unit 10, upstream transport unit 4, downstream ink droplet discharging unit 11, and the downstream transport unit 5 are established such that the upstream ink droplet discharging unit and the downstream ink droplet discharging unit are moved half a pitch in a direction orthogonal to the transport direction, while the cap portions 13a-13d and 14a-14c are moved upward to bring the caps into close contact with the nozzle surfaces of the ink jet heads 10a-10d and 11a-11c, respectively, thereby closing up the nozzles. Because the distance between the nozzles and the caps is short, it is possible to shorten the time required to close the nozzles and thus improve the efficiency of printing beyond the methods currently used in the art, wherein the ink jet head may be moved almost the entire span of the transport belt toward a head recovery unit located on a transport belt at a positioned below the ink jet head, in order for a printing process to be performed.

When a printing operation begins following a capping operation, the relative positions of the upstream ink droplet discharging unit 10, upstream transport unit 4, downstream ink droplet discharging unit 11, and downstream transport unit 5 are established such that the upstream ink droplet discharging unit and the downstream ink droplet discharging unit are moved half a pitch in a direction orthogonal to the transport direction. Therefore, it is possible to move the upstream ink droplet discharging unit 10 and the downstream ink droplet discharging unit 11 from the position for capping the ink jet heads 10a-10d and 11a-11c to the printing position quickly. As a result, it is possible to shorten the time required to restore the printing positions and thus improve the efficiency of printing, as compared to, for example, a method wherein ink jet head is moved across the span of the transport belt during a capping operation, and then returned to a printing position during a printing operation.

During the flushing operation, the positions of the upstream ink droplet discharging unit 10, the upstream transport unit 4, the downstream ink droplet discharging unit 11, and the downstream transport unit 5 are established such that the upstream ink droplet discharging unit and the downstream ink droplet discharging unit are moved half a pitch in a direction orthogonal to the transport direction. Since this is a relatively small distance, it is possible to arrange the ink jet heads 10a-10d and 11a-11c above the upstream transport belt 4 and the downstream transport belt 5, respectively, in a relatively quick manner, so that the ink jet heads 10a-10d and 11a-11c are interposed between the transport belts 4a-4d and the transport belts 5a-5d, respectively. As a result, it is possible to shorten the time required to establish the positions and thus improve the efficiency of printing, as compared to, for example, methods currently used in the art wherein the ink jet head is moved across the span of the transport belt toward a head recovery unit, where the ink may be discharged.

During a printing operation, since a region of the printing medium 6 onto which ink droplets are discharged is attracted to the transport belt, it is possible to prevent the region from moving. Therefore, it is possible to improve the flatness of a region onto which ink droplets are discharged, as compared to, for example, methods wherein ink droplets are discharged onto regions of the printing medium 6 between the transport belts. As a result, it is possible to prevent variations in the distance between the printing medium 6 and the ink jet heads 10a-10d and 11a-11c, and thus more accurately transfer the ink droplets to the target positions of the printing medium 6. Thus, it is possible to prevent image blur or distortion, and improve image quality.

In other methods known in the art wherein trapezoidal support members are used for supporting the printing medium 6 between the transport belts 4a-4d of the upstream transport unit 4 and transport belts 5a-5d of the downstream transport unit 5, the printing medium 6 curls in a concave shape, making it difficult for the support members to prevent the deformation of the printing medium 6. As a result, the flatness of the printing medium 6 is lowered, and errors may occur.

However, according to the above-described embodiment, it is possible to improve the flatness of regions of the printing medium onto which ink droplets are discharged. That is, the flatness of regions of the printing medium in the areas of on the upstream transport unit 4 and the downstream transport unit 5 that face the ink jet heads 10a-10d and 11a-11c, respectively, are improved. Therefore, it is possible to prevent the printing medium 6 from curling up and potentially colliding with the support members of the ink jet heads 10a-10d and 11a-11c. As a result, it is possible to prevent the deformation of the printing medium 6 and damage to the ink jet heads 10a-10d and 11a-11c, and thus improve the mechanical reliability of an ink jet printer.

When the printing medium 6 collides with the support member of each of the ink jet heads 10a-10d and 11a-11c, the printing medium 6 is deformed and damaged. Moreover, additional errors occur when the leading edge of the printing medium 6 having high rigidity collides with the support member, the printing medium acts as a load that hinders transportation, causing the transport speed of the printing medium 6 to vary. As a result, an error occurs in the landing position of ink droplets, and image quality is lowered.

(2) During a cleaning, capping, or flushing operations, the upstream ink droplet discharging unit 10 and downstream ink droplet discharging unit 11 are each moved orthogonal to the transport direction by a distance corresponding to the width of each of the ink jet heads 10a-10d and 11a-11c. Therefore, when the ink jet printer performs wide width printing corresponding to an A3 size sheet, the ink droplet discharging units are moved by only a distance corresponding to the width of one head (for example, 1 inch, that is, 25.4 mm), meaning that it is possible to completely change the positions to the needed operation within one second or several seconds. As a result, it is possible to prevent the interruption of printing due to the cleaning, capping, or flushing operation, and thus prevent the efficiency of printing from being lowered.

Further, since the time required to change the relative position is short, it is possible to prevent ink in the nozzles from drying during the change, and thus the viscosity of ink is less varied when the ink droplet discharging units are moved to a printing position after the cleaning operation is completed. As a result, it is possible to prevent a variation in the flight trajectory of ink droplets or a variation in the discharge amount of ink, and thus improve the stability of printing.

By way of comparison, when a cleaning or flushing operation is performed in a printer currently used in the art, the head unit is moved toward a maintenance unit that is arranged in a region close to a sheet transport unit. When the head unit has a width of 300 mm is used to print an image on an A3 size printing medium, it is difficult to move the maintenance unit below the head unit quickly, thus printing may be interrupted for a long period of time, for example, several tens of seconds to several minutes, which results in the deterioration of the efficiency of printing. In addition, when the head unit returns to a printing position after the cleaning or flushing operation is completed, the process takes an additional period of time, during which the ink in the nozzles may dry, causing variations in the viscosity of the ink, which results in a variation in the flight trajectory of ink droplets or the discharge mount of ink. As a result, the stability of printing is lowered, and image blur occurs.

Moreover, during a capping operations in printers currently used in the art, the head unit is moved to a region across the span of the transport belt. Then during a printing operation, an ink jet head is returned to a printing position. When the head unit having a width of 300 mm is used to print an image on an A3 size printing medium 6, it is difficult to move the ink jet head at a high speed, and the start of printing may be delayed for a long time, for example, several tens of seconds to several minutes, which results in the deterioration of the efficiency of printing. In addition, while the head unit moves to a printing position, ink in the nozzles may dry, and the viscosity of the ink may vary, resulting in variations in the flight trajectory of ink droplets or the discharge mount of ink. As a result, the stability of printing is lowered, and image blur occurs.

(3) In the above-described embodiment, the upstream ink droplet discharging unit 10 and the downstream ink droplet discharging unit 11 are moved in the direction orthogonal to the transport direction in order to position the upstream ink droplet discharging unit 10, the upstream transport unit 4, the downstream ink droplet discharging unit 11, and the downstream transport unit 5 for the various operations. However, the invention is not limited thereto. For example, only the upstream transport unit 4 and the downstream transport unit 5 may be moved in order to establish the relative positions. In this case, it is possible to simplify the structure of the mechanism.

When the upstream transport unit 4 and the downstream transport unit 5 are moved orthogonal to the transport direction, the upstream transport unit 4 and downstream transport unit 5 may be moved a distance corresponding to the width of each of the ink jet heads 10*a*-10*d* and 11*a*-11*c*.

(4) In the above-described embodiment, the upstream ink droplet discharging unit 10 and the downstream ink droplet discharging unit 11 may move in order to perform the cleaning, capping, or flushing processes, but the invention is not limited thereto. For example, the following structure may be used: an upstream printing medium sensor may be provided at the upstream side of the upstream ink droplet discharging unit 10 to detect the passage of the printing medium 6 transported by the upstream transport unit 4, while a downstream printing medium sensor is provided at the downstream side in order to detect the passage of the printing medium 6 transported by the downstream transport unit 5, so that the location of the printing medium 6 may be detected. Then, when it is determined that there is no printing medium 6 between, the non-printing positions of the upstream ink droplet discharging unit 10, the upstream transport unit 4, the downstream ink droplet discharging unit 11, and the downstream transport unit 5 may be established.

In the above-described embodiment, the cap portions 13*a*-13*d* and the cap portions 14*a*-14*c* serve as the flushing ink receiving units, but the invention is not limited thereto. Instead of using the cap portions, dedicated flushing ink receiving units may be provided to receive ink droplets. In this case, the dedicated flushing ink receiving units may be fixed without moving any mechanism up and down.

In the embodiments described above, an ink jet printer is used as an example of the liquid ejecting apparatus, but the invention is not limited thereto. The invention can be applied to any fluid ejecting apparatus that ejects or discharges liquid materials, including those that eject materials other than ink, including those that eject liquid materials having particles of a functional material dispersed therein and a fluid material, such as gel, and the like. For example, the invention can be applied to the following liquid ejecting apparatuses: a liquid ejecting apparatus that ejects a liquid material having a material forming electrodes or a color material, which is used to manufacture a liquid crystal display, an EL (electro-luminescent) display, or a surface-emission display, dispersed or dissolved therein; a liquid ejecting apparatus that ejects a bio-organic material used to manufacture a bio-chip; a liquid ejecting apparatus that ejects a liquid material, such as a precise pipette; a liquid ejecting apparatus that ejects a lubricant to precise machines, such as watches and cameras; a liquid ejecting apparatus that ejects onto a substrate a transparent resin liquid, such as an ultraviolet-curable resin, to form a minute hemispherical lens (optical lens) that is used for an optical communication element; a liquid ejecting apparatus that ejects an acid or alkali etchant; and a fluid ejecting apparatus that ejects gel. Thus, the invention can be applied to any kind of liquid ejecting apparatuses.

What is claimed is:

1. A liquid ejecting apparatus capable of ejecting a liquid material from liquid ejecting heads onto a medium transported by transport belts, the apparatus comprising:

an upstream transport unit that includes a plurality of transport belts, which are rotated in a transport direction corresponding to the direction in which the medium is transported, which are arranged at predetermined intervals in a direction orthogonal to the transport direction;

a downstream transport unit provided further downstream than the upstream transport unit in the transport direction which includes a plurality of transport belts, which are rotated in the transport direction and arranged at predetermined intervals in the direction orthogonal to the transport direction;

an upstream liquid ejecting unit that includes a plurality of liquid ejecting heads which are arranged at predetermined intervals in the direction orthogonal to the transport direction;

a downstream liquid ejecting unit that includes a plurality of liquid ejecting heads which are arranged at predetermined intervals in the direction orthogonal to the transport direction;

a maintenance unit that is provided between the transport belts of the upstream transport unit and downstream transport unit; and a position setting unit that is capable of establishing the relative positions of the upstream liquid ejecting unit, the upstream transport unit, the downstream liquid ejecting unit, and the downstream transport unit during a printing process such that the liquid ejecting heads of the upstream liquid ejecting unit face and the downstream liquid ejecting unit face the transport surfaces of the transport belts of the upstream transport unit and downstream transport unit, respectively, and being further capable of establishing the relative positions of the upstream liquid ejecting unit, the upstream transport unit, the downstream liquid ejecting unit, and the downstream transport unit during a maintenance process such that the liquid ejecting heads of the upstream liquid ejecting unit and the downstream liquid ejecting unit face the maintenance unit.

2. The liquid ejecting apparatus according to claim 1, wherein the maintenance operation is a cleaning operation wherein the liquid material is sucked from the liquid ejecting heads, and the maintenance unit comprises cap portions capable of capping the liquid ejecting heads of the upstream liquid ejecting unit and downstream liquid ejecting unit which are arranged between the transport belts of the upstream transport unit and downstream transport unit and a pump capable of sucking ink from the upstream liquid ejecting unit and the downstream liquid ejecting unit.

3. The liquid ejecting apparatus according to claim 1, wherein the maintenance operation is a capping operation wherein the liquid ejecting heads are capped by a plurality of cap portions within the maintenance unit arranged between the transport belts of the upstream transport unit and downstream transport unit which are capable of capping the liquid ejecting heads of the upstream liquid ejecting unit and downstream liquid ejecting unit.

4. The liquid ejecting apparatus according to claim 1, wherein the maintenance operation is a flushing operation wherein the liquid material is discharged from the liquid ejecting heads onto an object other than the medium, and the maintenance unit comprises liquid receiving portions that are capable of receiving the liquid material flushed from the liquid ejecting heads of the upstream liquid ejecting unit and downstream liquid ejecting unit which are arranged between the transport belts of the upstream transport unit and downstream transport unit.

5. The liquid ejecting apparatus according to claim 4, wherein the liquid receiving portions of the maintenance unit are cap portions that are capable of capping the liquid ejecting heads of the upstream liquid ejecting unit and downstream liquid ejecting unit.

6. The liquid ejecting apparatus according to claim 1, wherein the positioning unit moves the upstream liquid ejecting unit and the downstream liquid ejecting unit in a direction orthogonal to the transport direction to establish the relative positions of the upstream transport unit, the downstream transport unit, and the maintenance unit.

7. The liquid ejecting apparatus according to claim 1, wherein the positioning unit moves the upstream transport unit, the downstream transport unit, and the maintenance unit in a direction orthogonal to the transport direction to establish the relative positions of the upstream liquid ejecting unit and the downstream liquid ejecting unit.

8. The liquid ejecting apparatus according to claim 1, further comprising:

an upstream medium sensor provided at the upstream side of the upstream liquid ejecting unit in the transport direction which is capable of detecting the passage of the medium transported by the upstream transport unit; and a downstream medium sensor provided at the downstream side of the downstream liquid ejecting unit in the transport direction which is capable of detecting the passage of the medium transported by the downstream transport unit, wherein the positioning unit determines whether the medium is located between the upstream liquid ejecting unit and the upstream transport unit and between the downstream liquid ejecting unit and the downstream transport unit using the upstream medium sensor and downstream medium sensor, and wherein when it is determined that there is no medium between the upstream liquid ejecting unit and the upstream transport unit and between the downstream liquid ejecting unit and the downstream transport unit, the positioning unit establishes the relative position of the upstream liquid ejecting unit, the downstream liquid ejecting unit, and the maintenance unit.

9. A liquid ejecting apparatus capable of ejecting a liquid material from liquid ejecting heads onto a medium transported by transport belts, the apparatus comprising:

an upstream transport unit that includes a plurality of transport belts, which are rotated in a transport direction corresponding to the direction in which the medium is transported, which are arranged at predetermined intervals in a direction orthogonal to the transport direction;

a downstream transport unit provided further downstream than the upstream transport unit in the transport direction which includes a plurality of transport belts, which are rotated in the transport direction and arranged at predetermined intervals in the direction orthogonal to the transport direction;

an upstream liquid ejecting unit that includes a plurality of liquid ejecting heads which are arranged at predetermined intervals in the direction orthogonal to the transport direction;

a downstream liquid ejecting unit that includes a plurality of liquid ejecting heads which are arranged at predetermined intervals in the direction orthogonal to the transport direction;

a maintenance unit that is provided between the transport belts of the upstream transport unit and downstream transport unit; and a position setting unit that is capable of moving the upstream transport unit and downstream transport unit to establish the relative positions of the upstream liquid ejecting unit, the upstream transport unit, the downstream liquid ejecting unit, and the downstream transport unit during various printing processes.

10. The liquid ejecting apparatus according to claim 9, wherein the printing process is a cleaning operation wherein the position setting unit moves the upstream transport unit and the downstream transport unit to face the maintenance unit so that the liquid material may be sucked from the liquid ejecting heads, wherein the maintenance head comprises cap portions capable of capping the liquid ejecting heads of the upstream liquid ejecting unit and downstream liquid ejecting unit and a pump capable of sucking ink from the upstream liquid ejecting unit and the downstream liquid ejecting unit.

11. The liquid ejecting apparatus according to claim 9, wherein the printing process is a capping operation wherein the position setting unit moves the upstream transport unit and the downstream transport unit to face the maintenance unit so that the liquid ejecting heads are capped by a plurality of cap portions located within the maintenance unit arranged between the transport belts of the upstream transport unit and downstream transport unit which are capable of capping the liquid ejecting heads of the upstream liquid ejecting unit and downstream liquid ejecting unit.

12. The liquid ejecting apparatus according to claim 9, wherein the printing process is a flushing operation wherein the position setting unit moves the upstream transport unit and the downstream transport unit to face the maintenance unit such that the liquid material may be discharged from the liquid ejecting heads onto an object other than the medium, wherein the maintenance unit comprises liquid receiving portions that are capable of receiving the liquid material flushed from the liquid ejecting heads of the upstream liquid ejecting unit and downstream liquid ejecting unit.

13. The liquid ejecting apparatus according to claim 12, wherein the liquid receiving portions of the maintenance unit are cap portions that are capable of capping the liquid ejecting heads of the upstream liquid ejecting unit and downstream liquid ejecting unit.

14. The liquid ejecting apparatus according to claim 9, further comprising:

an upstream medium sensor provided at the upstream side of the upstream liquid ejecting unit in the transport direction which is capable of detecting the passage of the medium transported by the upstream transport unit; and a downstream medium sensor provided at the downstream side of the downstream liquid ejecting unit in the transport direction which is capable of detecting the passage of the medium transported by the downstream transport unit, wherein the positioning unit determines whether the medium is located between the upstream liquid ejecting unit and the upstream transport unit and between the downstream liquid ejecting unit and the downstream transport unit using the upstream medium sensor and downstream medium sensor, and wherein when it is determined that there is no medium between the upstream liquid ejecting unit and the upstream transport unit and between the downstream liquid ejecting unit and the downstream transport unit, the positioning unit establishes the relative position of the upstream liquid ejecting unit, the downstream liquid ejecting unit, and the maintenance unit.

* * * * *